United States Patent
Lutz et al.

(10) Patent No.: US 11,442,436 B2
(45) Date of Patent: Sep. 13, 2022

(54) INTEGRATION OF PACKAGE UNITS IN AN ENGINEERING SYSTEM

(71) Applicant: Siemens Aktiengesellschaft, Munich (DE)

(72) Inventors: Benjamin Lutz, Pfinztal (DE); Anna Palmin, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 120 days.

(21) Appl. No.: 16/692,372

(22) Filed: Nov. 22, 2019

(65) Prior Publication Data

US 2020/0166914 A1 May 28, 2020

(30) Foreign Application Priority Data

Nov. 26, 2018 (EP) .................................... 18208248

(51) Int. Cl.
*G05B 19/418* (2006.01)
*G05B 19/042* (2006.01)

(52) U.S. Cl.
CPC ..... *G05B 19/4188* (2013.01); *G05B 19/0428* (2013.01); *G05B 19/41845* (2013.01); *G05B 2219/33139* (2013.01)

(58) Field of Classification Search
CPC .................................................. G05B 19/4188
USPC ......................................................... 700/79
See application file for complete search history.

(56) References Cited

U.S. PATENT DOCUMENTS

| | | |
|---|---|---|
| 2004/0199925 A1 | 10/2004 | Nixon et al. |
| 2008/0282332 A1* | 11/2008 | Jurisch ............... G05B 19/0428 726/6 |
| 2016/0043866 A1* | 2/2016 | Nixon ................... H04L 9/3226 713/168 |
| 2017/0308067 A1 | 10/2017 | Lamparter et al. |
| 2017/0336782 A1 | 11/2017 | Maurmaier et al. |
| 2019/0044724 A1* | 2/2019 | Sood ........................ H04L 9/14 |

FOREIGN PATENT DOCUMENTS

| | | |
|---|---|---|
| EP | 3246773 | 11/2017 |
| GB | 2398659 | 8/2004 |
| WO | WO2016/074730 | 5/2016 |

OTHER PUBLICATIONS

Siebl, "Module-Based Production in the Process Industry—Effects on Automation in the "Industrie 4.0" Environment: Recommendations of the Modular Automation Working Group Following Namur Recommendation NE 148" White Paper, ZVEI Modular Automation working group, Mar. 2015, 36 pages (Year: 2015).*
TCG, "TCG Guidance for Securing Network Equipment Using TCG Technology" by Trusted Computing Group, Jan. 17, 2018, 58 pgs., (Year: 2018).*

(Continued)

*Primary Examiner* — Emilio J Saavedra
(74) *Attorney, Agent, or Firm* — Cozen O'Connor

(57) ABSTRACT

A method and technical module in a technical installation, which includes at least one technical function and which is configured for integration into a higher-level control level of the technical installation, wherein functional rights relating to the at least one technical function are stored in the technical module.

9 Claims, 1 Drawing Sheet

(56) References Cited

OTHER PUBLICATIONS

Wago: "DIMA—Dezentrale Intelligenz für modulare Anlagen", pp. 1-8, 2015.
Seibl Felix: "Modulbasierte Produktion in der Prozessindustrie—Auswirkungen auf die Automation im Umfeld von Industrie 4.0 Empfehlungen des AK Modulare Automation zur NE 148 der Namur Fachverband Automation", pp. 9-12; pp. 15-16; pp. 18-26; 2015.
EP Search Report dated May 23, 2019 based on EP18208248 filed Nov. 26, 2018.
Office Action dated Dec. 7, 2021 issued in European Patent Application No. 18208248.7.

* cited by examiner

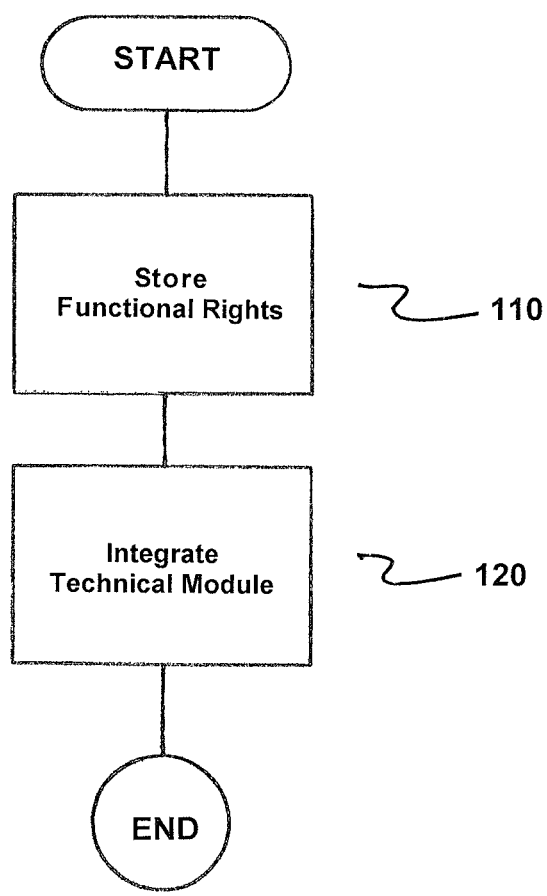

INTEGRATION OF PACKAGE UNITS IN AN ENGINEERING SYSTEM

BACKGROUND OF THE INVENTION

1. Field of the Invention

The invention relates to a method for integrating a technical module into an engineering system of a technical installation, a technical module in the technical installation, and to a technical installation with a plurality of technical modules and an engineering system.

2. Description of the Related Art

High demands are placed on operators of technical installations in terms of being able to respond quickly to changes in market requirements above all in the pharmaceutical and specialty chemicals industries. Modular installations enable the installation operators to significantly reduce what is known as the "time-to-market" and to respond quickly to changes in market requirements by rebuilding the installation in a cost-effective manner. To this end, the installation operators can set up a pool of modular units (e.g., process units), with the aid of which they can put together a specific installation by means of what is known as orchestration. If the installation is to be rebuilt, individual modules or package units are removed and replaced by other, for instance, more efficient modules or package units.

In the present context, a module or a package unit is understood to mean a part of a technical installation that can be integrated into a central engineering system of the technical installation as a self-contained unit. Modules are larger than individual measuring points or technical facilities. A module can also be a subsystem of the technical installation with a complete process-related structure which comprises a number of technical facilities (e.g., tanks) which, in turn, contain a number of measuring points (e.g., valves, monitors, controllers or motors).

The publication WO 2016/074730 A1 describes a method as to how a modular technical installation can be created via self-disclosure information of the modules. This method is based on self-disclosure information of the individual modules that is available online.

If a module or a package unit is imported into the engineering system, functional rights for various technical facilities and measuring points contained therein must then be defined or awarded. Any reference with respect to security management is missing here. Nowadays, the process for defining or awarding the functional rights is proving to be very complicated.

The functional rights are generally awarded "quickly" and not optimally (which in particular means "not restrictive enough") in terms of security. This represents a significant risk from an information technology security perspective. Therefore, the use of the same module or package unit (if these are gradually integrated into various process-related projects) can be based on different functional rights each time. This is then particularly critical if the module/the package unit has critical installation parts that are only permitted to be operated, monitored or adjusted by specialists.

SUMMARY OF THE INVENTION

In view of the foregoing, it is therefore an object of the invention to provide a simple and, at the same time, more secure method for integrating technical modules into an engineering system of a technical installation.

This and other objects and advantages are achieved in accordance with the invention by a method for integrating a technical module into an engineering system in a technical installation, wherein the technical module comprises at least one technical function, by a technical module in a technical installation and by a technical installation with a plurality of technical modules and an engineering system.

In accordance with the method of the invention, functional rights relating to the at least one technical function are stored in the technical module before integration into the engineering system.

A technical module is understood to mean a self-contained technical unit that can be integrated into a higher-level control level. One such technical module can be, for instance, a fusion of a number of measuring points or a larger installation part in an industrial installation. The technical module need not originate from the field of the industrial installations, but can for instance also be a motor module of an automobile, a ship or suchlike.

The higher-level control level can be any system, in particular an engineering system in a process control system, which is configured to link and coordinate individual technical modules with respect to control/automation.

The term "technical function" is to be interpreted widely. Technical function can involve the opening or closing of a valve, the starting or stopping of a motor or the filling or emptying of a tank, for instance.

The functional rights stored for the individual technical functions of the module need not necessarily be identical here. A module can be a tank, a separator and a heating apparatus, for instance. In order to be able to access the technical functions of the heater, simple operator functional rights can be awarded, for instance. Here "access" can indicate "operation" and "monitoring", for instance. In order to be able to access the technical functions of the heating apparatus, higher functional rights can by contrast be awarded, which also only allow a "monitoring" of the heating apparatus, for instance.

If the module is integrated into the higher-level control level, then the different technical functions or technological regions of the module are already pre-assigned with functional rights (required or useful herefor). This dispenses with the effort involved in defining or awarding the functional rights while coordinating the modules in the higher-level control level. Moreover, it is possible to prevent other functional rights underlying the same module or the same package unit for the use thereof in an effective and simple manner if the module is integrated into various, for instance, process-related projects. Information technology security concerns can thus already be confronted in advance with the use of critical installation parts as modules. If the user role of an operator wishes to use special technical functions of a module, then the rights required herefor in the higher-level control level can be issued to the user role. The rights grading of the individual technical functions of a module allocated in advance is permanent, however. A downgrading of the functional rights for the individual technical functions in the higher-level control level is not possible, which brings about significant increased security.

Before storing the functional rights within the scope of a security check, it is preferably firstly determined which minimal extent the functional rights to be stored are required to have as a function of predefined user roles in the technical installation, where an extent of the functional rights to be stored in the technical module is fixed based on the results of the information technology security check (IT security check). Here, a user role represents an operator or an administrator, for instance. Within the scope of an analysis of this type, based on the structure of the module, an examination is performed to determine which minimal functional rights are required for the respective existing user roles. These minimal functional rights are then assigned to the individual user roles and stored in the module. The preferred embodiment of the method ensures that minimal functional rights are awarded, which, viewed from a security perspective, are advantageously proven.

Within the scope of an advantageous embodiment of the invention, after storing the functional rights in the technical module a check is performed to determine whether after fixing the extent of the functional rights, a trouble-free operation of the technical installation is possible. This can ensure that the effected definition or the assignment of the functional rights to the existing user roles enables a trouble-free operation of the technical installation under any conditions. Here, a check can in particular be performed to determine whether all technical functions of the respective technical module can also be used by the higher-level control level (assuming corresponding authorizations).

It is also an object of the invention to provide a technical module of a technical installation, which comprises at least one technical function and which is configured for integration into a higher-level control level of the technical installation. The technical module is a characterized in accordance with the invention in that functional rights relating to the at least one technical function are stored in memory of the module.

At least the stored functional rights are preferably identified as trusted compared with the higher-level control level of the technical installation via a suitable authentication method. The entire technical module is particularly preferably identified as trusted compared with the higher-level control level.

The individual functional rights and/or the entire technical module are advantageously protected against unauthorized manipulations via suitable integrity protection and authentication mechanisms. To this end, a manufacturer of the technical module can provide individual technical functions and/or the entire technical module with (in each case) a securely stored private key and an associated (manufacturer) certificate, for instance. A manipulation of functional rights can be identified here when the certificate is validated compared with the higher-level control level of the technical installation. In this way, a protective level of the technical module can be increased within the sense of IT security with respect to unauthorized access from third parties.

It is also an object of the invention to provide a technical installation having a plurality of technical modules and a higher-level control level, wherein at least one technical module is configured as described above.

Although the invention has been illustrated and described in detail by the preferred exemplary embodiment, the invention is not restricted by the examples disclosed and other variations can be derived therefrom by a person skilled in the art without departing from the protective scope of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The FIGURE is a flowchart of the method in accordance with the invention.

DETAILED DESCRIPTION OF THE EXEMPLARY EMBODIMENTS

The FIGURE is a flowchart of the method for integrating a technical module into a higher-level control level of a technical installation, the technical module comprising at least one technical function. The method comprises storing functional rights relating to the at least one technical function in the technical module before integration of the technical module into the higher-level control level of the technical installation, as indicated in step 110. Next, the technical module is integrated into the higher-level control level, as indicated in step 120.

In one exemplary embodiment, a technical module is part of an industrial installation. The technical module comprises the following information: installation images: these are provided in a standardized format for the operation and monitoring by an operator station server for visualization in an operator station client; interface: an interface description is used to operate, monitor and automate the technical module in association with other installation parts; equipment: a type of technological hierarchy for structurally describing the technical module (e.g. buffer tank, reactor, mixer etc.); the installation images and interfaces are mapped accordingly on the equipment; for instance a signal for controlling the mixer is offered to an operator by way of an installation image of the mixer.

In accordance with the invention, the technical module is provided with functional rights relating to the individual, technical functions of the module. This concerns the minimal required functional rights for operating and monitoring the technical module. An information technology security analysis (IT security analysis) was performed here in advance to determine the minimal functional rights. The aim here is to grant the lowest possible functional rights (i.e., assigned to the lowest possible operating authorization level) that the user requires to perform his/her tasks within the scope of the user role assigned to him/her, to each user in the technical installation. While a higher access right of a grade X is required for the mixer, for instance, an ordinary access right is sufficient for the buffer tank.

If the inventively configured technical module is imported into a central engineering system of the industrial installation functioning as a higher-level control level (to this end proprietary exchange formats, such as SIMATIC ML or standardized exchange formats such as MTP (Module Type Package) are used), the engineering system is extended by the "equipment" and the installation images of the technical module. In this way, the functional rights required for the respective technical functions of the technical module are also imported from the technical module into the engineering system as a higher-level control level and are stored there.

If the technical functions are now associated with users in specific user roles by the engineering system, then the engineering system can check whether the provided user actually has the required rights in his/her user role to establish an association. If, in the user role "normal operator", the user "X" was not assigned the right "operating authorization level 3", in the engineering system he then cannot be associated with a technical function "mixer" that has a corresponding functional level as a condition. The association will then branch accordingly.

After integration of a technical module in the central engineering system, suitable user roles can advantageously be derived, if existing user roles do not have the corresponding sets of rights in order to configure, operate and monitor the technical module. This is then particularly helpful if the industrial installation is already in operation and a change in user roles during operation would be complicated. The corresponding user role can then be assigned to an available user, e.g., "Y", so that the association with the technical module and/or individual technical functions of the technical module is possible.

Although the invention has been illustrated and described in detail with the preferred exemplary embodiment, the invention is not restricted by the examples given, and a person skilled in the art can derive other variations therefrom without departing from the protective scope of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for integrating a technical module into a higher-level control level of a technical installation, the technical module comprising at least one technical function, a private key and an associated certificate, the method comprising:
   storing permanently assigned functional rights relating to the at least one technical function in the technical module comprising the at least one technical function, the private key and the associated certificate before integration of the technical module into the higher-level control level of the technical installation, said private key and associated certificate protecting individual rights from unauthorized manipulations; and
   integrating the technical module comprising the at least one technical function, the private key and the associated certificate into the higher-level control level.

2. The method as claimed in claim 1, further comprising:
   determining which minimal extent the permanently assigned functional rights to be stored are required to have as a function of predefined user roles in the technical installation before storing the permanently assigned functional rights within a scope of a safety check,
   wherein an extent of the permanently assigned functional rights to be stored in the technical module is fixed based on results of an information technology security check.

3. The method as claimed in claim 2, further comprising:
   performing a check to determine whether a trouble-free operation of the technical installation is possible after defining the extent of the functional rights after storing the functional rights in the technical module comprising the at least one technical function, the private key and the associated certificate.

4. The method as claimed in claim 1, wherein the technical installation comprises an engineering system of a process control system.

5. A technical module of a technical installation, which comprises at least one technical function, a private key and an associated certificate, and which is configured for integration into a higher-level control level of the technical installation, said private key and associated certificate protecting individual rights from unauthorized manipulations; wherein permanently assigned functional rights relating to the at least one technical function are stored in memory of the technical module comprising the at least one technical function, the private key and the associated certificate.

6. The technical module as claimed in claim 5, wherein at least the stored permanently assigned functional rights are identified as trusted after comparison with the higher-level control level of the technical installation via an authentication method.

7. The technical module as claimed in claim 5, wherein an entirety of the technical module comprising the at least one technical function, the private key and the associated certificate is identified as trusted.

8. A technical installation comprising:
   a plurality of technical modules; and
   a higher-level control level;
   wherein at least one technical module is configured as claimed in claim 5.

9. A technical installation comprising:
   a plurality of technical modules; and
   a higher-level control level;
   wherein at least one technical module is configured as claimed in claim 6.

* * * * *